(12) United States Patent
Hair et al.

(10) Patent No.: US 11,713,080 B2
(45) Date of Patent: Aug. 1, 2023

(54) DOUBLE SUBFRAMES WITH ISOLATION COUPLINGS

(71) Applicant: Ford Global Technologies, LLC, Dearborn, MI (US)

(72) Inventors: Keith Hair, Canton, MI (US); Steven C. Hopson, Saline, MI (US); Marc Peerbolte, Canton, MI (US); Thomas Trebowicz, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 16/993,080

(22) Filed: Aug. 13, 2020

(65) Prior Publication Data

US 2022/0048569 A1 Feb. 17, 2022

(51) Int. Cl.
*B62D 21/11* (2006.01)
*B60K 17/00* (2006.01)
*B62D 27/02* (2006.01)

(52) U.S. Cl.
CPC .............. *B62D 21/11* (2013.01); *B60K 17/00* (2013.01); *B62D 27/02* (2013.01)

(58) Field of Classification Search
CPC ........ B62D 21/11; B62D 24/02; B62D 21/00; B62D 27/02; B60K 17/00; B60K 1/00; B60K 2001/001; B60K 17/04; B60K 1/04; B60K 2001/0411; B60K 17/105; B60G 2204/15
USPC ........................................................ 180/312
See application file for complete search history.

(56) References Cited

U.S. PATENT DOCUMENTS

| 7,726,429 | B2 | 6/2010 | Suzuki | |
|---|---|---|---|---|
| 7,854,282 | B2 * | 12/2010 | Lee | B60L 50/16 |
| | | | | 180/65.265 |
| 8,402,878 | B2 * | 3/2013 | Schreiner | F41H 5/026 |
| | | | | 89/918 |
| 8,875,834 | B1 * | 11/2014 | Sirbu | B62D 21/10 |
| | | | | 280/124.109 |
| 9,073,428 | B2 | 7/2015 | Shimada et al. | |
| 11,097,679 | B2 * | 8/2021 | Sakai | B60R 19/34 |
| 11,198,473 | B2 * | 12/2021 | Okamoto | B62D 21/11 |
| 2013/0181485 | A1 * | 7/2013 | Rumpel | B62D 25/08 |
| | | | | 29/897.2 |
| 2020/0102012 | A1 * | 4/2020 | Sakai | B62D 7/16 |
| 2020/0102014 | A1 * | 4/2020 | Sakai | B62D 21/07 |

FOREIGN PATENT DOCUMENTS

| CN | 113086007 | A | * | 7/2021 | | |
|---|---|---|---|---|---|---|
| DE | 102004030463 | A1 | * | 1/2006 | ........ | B60G 21/0551 |
| JP | 6982197 | B2 | * | 12/2021 | .............. | B60K 1/04 |
| KR | 101987150 | | | 6/2014 | | |
| KR | 101481185 | | | 1/2015 | | |
| WO | WO-2011119764 | A1 | * | 9/2011 | .............. | B60G 7/02 |
| WO | WO-2016184607 | A1 | * | 11/2016 | ............. | B60B 35/14 |

* cited by examiner

*Primary Examiner* — Paul N Dickson
*Assistant Examiner* — Caitlin Anne Miller
(74) *Attorney, Agent, or Firm* — Lorne Forsythe; Hanley, Flight & Zimmerman LLC

(57) ABSTRACT

Double subframes with isolation couplings are disclosed herein. An example vehicle disclosed herein includes a powertrain, a frame, a first subframe coupled to the powertrain via a first isolation coupling, and a second subframe coupled at least partially around the first subframe, the second subframe coupled to the frame.

20 Claims, 9 Drawing Sheets

DOUBLE SUBFRAMES WITH ISOLATION COUPLINGS

FIELD OF THE DISCLOSURE

This disclosure relates generally to vehicle frames and, more particularly, to double subframes with isolation couplings.

BACKGROUND

A vehicle frame, also referred to as a chassis, is the main supporting structure of a vehicle. Vehicle frames can be body-on-frame constructions, where the body of the vehicle is separate from the frame, or unibody constructions, where the frame and the body are integrated. The vehicle frame supports mechanical components of the vehicle and manages the static and dynamic loads on the vehicle (e.g., the weight of passengers and cargo, torsional twisting due to uneven road surfaces, torque from a vehicle engine and/or transmission, etc.). In some examples, vehicle frames include subframes. Subframes are discrete structures within the frame that support specific vehicle structures.

In recent years, electric vehicles (EV) have greatly increased in popularity. EVs are typically propelled via one or more electric motors via power stored in batteries. EVs have a variety of applications including personal transportation, public transportation, and freight delivery.

SUMMARY

An example vehicle disclosed herein includes a powertrain, a frame, a first subframe coupled to the powertrain via a first isolation coupling, and a second subframe coupled at least partially around the first subframe, the second subframe coupled to the frame.

An example apparatus disclosed herein includes a first subframe, and a second subframe disposed about the first subframe, the second subframe coupled to the first subframe via a first isolation coupling.

An example apparatus disclosed herein includes a first subframe coupled to a powertrain of a vehicle, and a second subframe coupled within a perimeter defined by the first subframe via a first coupling, the second subframe coupled to a frame of the vehicle, the first coupling to damp vibrations of the powertrain transmitted to the frame via the second subframe.

Figure 1:
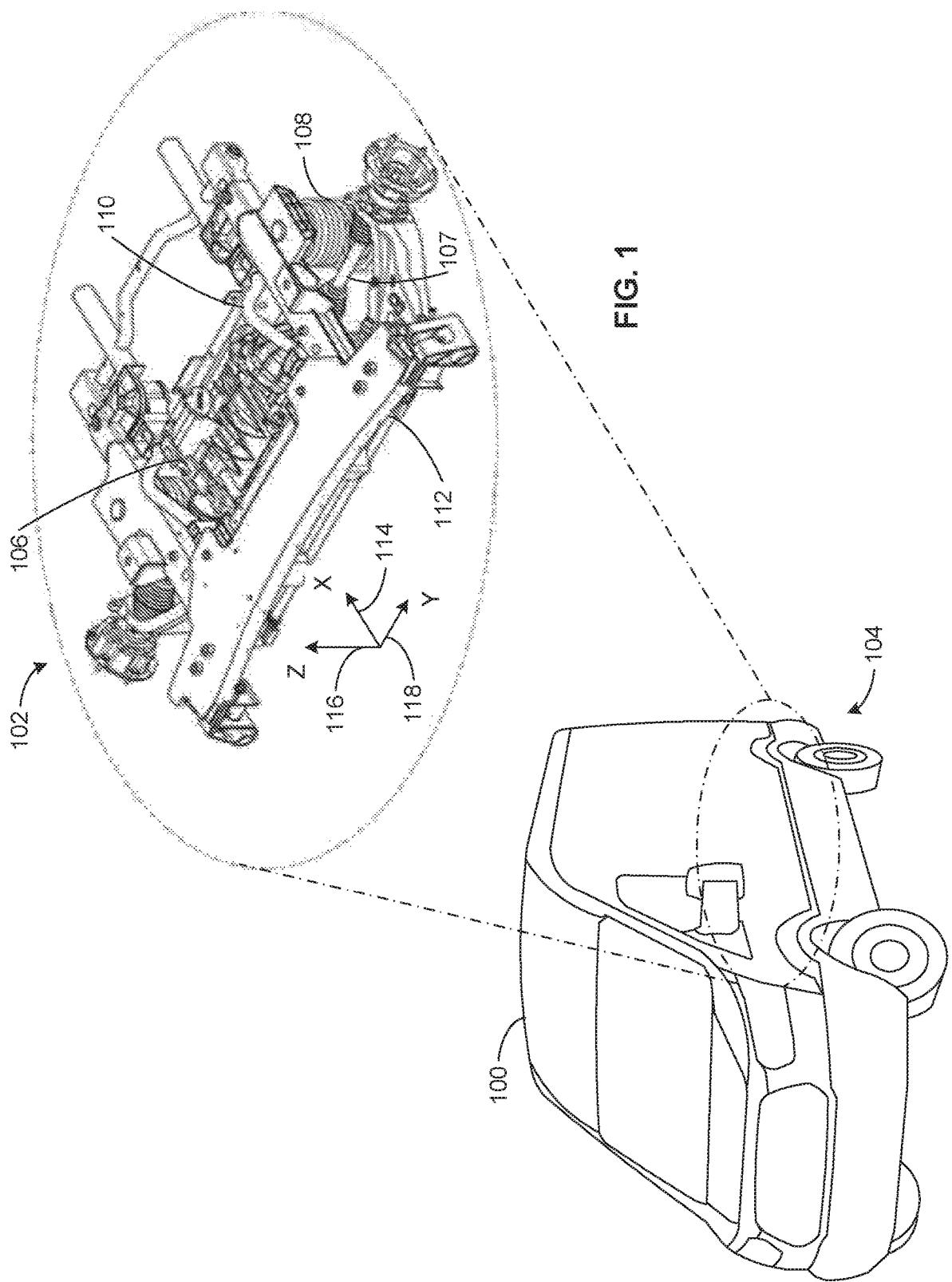
FIG. 1 illustrates an example system including a vehicle with a double subframe.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., section, linkage, area, region, or plate, etc.) is in any way on (e.g., positioned on, located on, disposed on, disposed about, or formed on, etc.) another part, indicates that the referenced part is either in contact with the other part, or that the referenced part is above the other part with one or more intermediate part(s) located therebetween. Connection references (e.g., attached, coupled, connected, joined, etc.) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, many vehicles that traditionally had internal combustion engines are being converted to EVs and/or partially electric vehicles. In some examples, vehicle subsystems must be redesigned to accommodate EV components (e.g., electric powertrains, batteries, power distribution units (PDU), electric motors, etc.) while maintaining crash safety and modularity design requirements. Particularly, some electric vehicle components (e.g., electric powertrains, etc.) produce high-frequency vibrations that have negative effects on the noise, vibration, and harshness (NVH) characteristics of the vehicle.

Example vehicle subframes disclosed herein overcome the above-noted deficiencies and include an inner subframe and an outer subframe. In some examples disclosed herein, an electric powertrain is coupled to the inner subframe and the outer subframe is coupled to the vehicle frame. In some examples disclosed herein, the inner subframe is coupled to the outer subframe via a first plurality of isolation couplings, the electric powertrain is coupled to the inner subframe via a second plurality of isolation couplings. Additionally or alternatively, the outer subframe can be coupled to a vehicle frame via a third plurality of isolation couplings. In some examples disclosed herein, the isolation couplings damp (e.g., reduce, eliminate, etc.) vibrations from the electric powertrain and improve the NVH characteristics of the vehicle. In some examples disclosed herein, the outer subframe includes a plurality of features that enable a suspension assembly of the vehicle to be coupled thereto.

As used herein, the orientation of features is described with reference to a lateral axis, a vertical axis, and a longitudinal axis of the vehicle associated with the features.

As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively As used herein, the lateral axis of the vehicle is perpendicular to the longitudinal and vertical axes and is generally parallel to the axles of the vehicle. In general, the attached figures are annotated with a set of axes including the lateral axis (Y), the longitudinal axis (X), and the vertical axis (Z). As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

In some examples used herein, the term "substantially" is used to describe a relationship between two parts that is within three degrees of the stated relationship (e.g., a substantially colinear relationship is within three degrees of being colinear, a substantially perpendicular relationship is within three degrees of being perpendicular, a substantially parallel relationship is within three degrees of being parallel, etc.).

FIG. 1 illustrates an example vehicle 100 with an example double subframe 102. In the illustrated example of FIG. 1, the double subframe 102 is coupled to an example frame 104 of the vehicle 100. In the illustrated example of FIG. 1, the example double subframe 102 supports an example powertrain 106, an example axle 107, and an example suspension assembly 108. In the illustrated example of FIG. 1, the double subframe 102 includes an example inner subframe 110 and an example outer subframe 112. In the illustrated example of FIG. 1, the double subframe 102 is coupled in the rear of the vehicle 100. In the illustrated example of FIG. 1, the double subframe 102 is coupled above the rear axle of the vehicle 100. In other examples, the double subframe 102 can be coupled to the vehicle frame 104 at any other suitable location (e.g., midbody-mounted, front-mounted, etc.). The example vehicle 100 with an example double subframe 102 is described with reference to an example longitudinal axis 114 that is parallel to the centerline of the vehicle 100, an example vertical axis 116 that is perpendicular to the ground, and an example lateral axis 118 that is perpendicular to the longitudinal axis 114 and the vertical axis 116.

In the illustrated example of FIG. 1, the example vehicle 100 is a van (e.g., a full-size van, a mini-van, etc.). In other examples, the vehicle 100 can be any type of vehicle (e.g., a truck, a sports utility vehicle (SUV), a semi-trailer truck, a railed vehicle, an all-terrain vehicle (ATV), watercraft, construction equipment, farming equipment, etc.). In the illustrated example of FIG. 1, the vehicle 100 has a rear-mounted motor (e.g., a component of the powertrain 106, etc.). The vehicle frame 104 of the vehicle 100 supports the components of the vehicle 100 (e.g., the powertrain 106, the subframe 102, etc.). In the illustrated example of FIG. 1, the vehicle frame 104 is a unibody frame. In other examples, the vehicle frame 104 can have any other suitable configuration (e.g., a body-on-frame design). In some examples, the vehicle frame 104 includes side rails that extend along the length of the vehicle 100 and cross members that connect the side rails. The coupling of the subframe 102 and the vehicle frame 104 is described in greater detail in conjunction with FIG. 9.

The powertrain 106 includes components that provide mechanical power to the vehicle 100. In the illustrated example of FIG. 1, the powertrain 106 is an electric powertrain that includes a power distribution unit (PDU). In other examples, the powertrain 106 can be a combustion powertrain or a hybrid powertrain. In the illustrated example of FIG. 1, the mechanical energy provided by the powertrain 106 is transferred to the axle 107, which drives the rear wheels of the vehicle 100. Additionally or alternatively, the powertrain 106 can include any other suitable components (e.g., a differential, a transmission, etc.). In some examples, during operation of the vehicle 100, the powertrain 106 produces high-frequency vibrations that can produce unfavorable noise, vibration, and harshness (NVH) characteristics for the vehicle 100.

The suspension assembly 108 connects the wheels of the vehicle 100 to the double subframe 102. In the illustrated example of FIG. 1, the inner subframe 110 is shaped to allow elements of the suspension assembly 108 and/or the powertrain 106 to pass underneath. In some examples, the suspension assembly 108 is coupled to the double subframe 102 via mounting features (e.g., mounting plates, welding surfaces, joints, bolt holes, etc.) of the double subframe 102. In some examples, the suspension assembly 108 is also coupled to the vehicle frame 104 of the vehicle 100.

The inner subframe 110 is coupled to the powertrain 106 via one or more isolation couplings (e.g., rubber bushings, etc.). In the illustrated example of FIG. 1, the inner subframe 110 is coupled within the outer subframe 112 such that an outer surface of the inner subframe 110 is coupled to an inner surface of the outer subframe 112. In the illustrated example of FIG. 1, the inner subframe 110 is coupled to the outer subframe 112 via four rubber bushings. In other examples, the inner subframe 110 can be coupled to the outer subframe 112 via any other suitable means (e.g., a weld, a press-fit, fasteners, fastener techniques, combinations thereof, etc.). The inner subframe 110 can be composed of steel, aluminum, and/or any suitable material(s) or combination thereof.

The outer subframe 112 is coupled to the inner subframe 110 and the vehicle frame 104. In the illustrated example of FIG. 1, the outer subframe 112 is coupled about the inner subframe 110 such that the outer subframe 112 partially surrounds the inner subframe 110. In the illustrated example of FIG. 2, the inner subframe 110 is disposed completely within a perimeter defined by the outer subframe 112. In other examples, the inner subframe 110 can include components that are disposed outside of the perimeter defined by the outer subframe 112.

Figure 2:
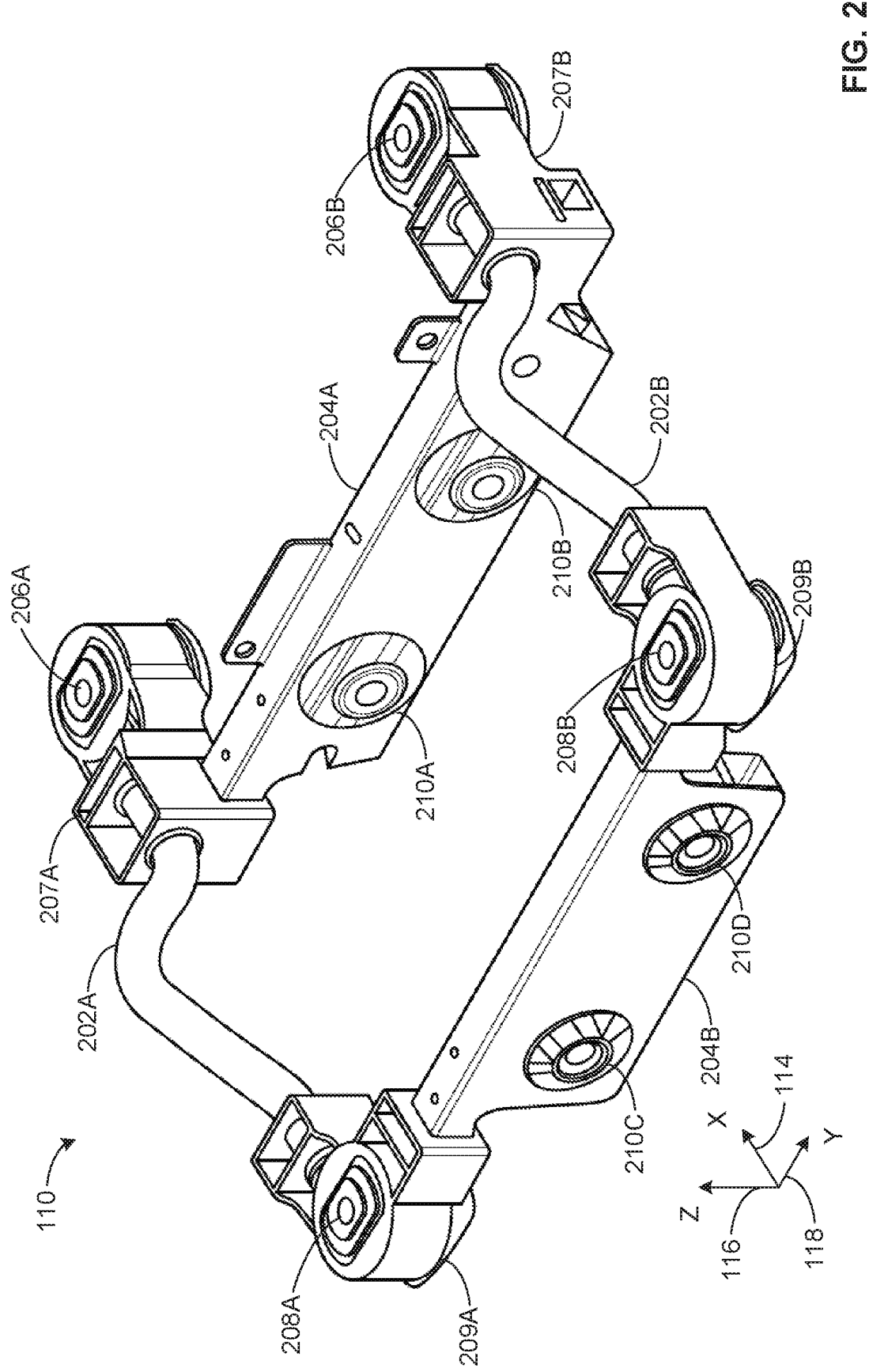
FIG. 2 is an isometric view of the example inner subframe of FIG. 1.

FIG. 2 is an isometric view of the example inner subframe 110 of FIG. 1. In the illustrated example of FIG. 2, the inner subframe 110 includes an example first side rail 202A, an example second side rail 202B, an example first cross member 204A, and example second cross member 204B. The inner subframe 110 also includes an example first rear bushing 206A disposed within an example first rear bushing housing 207A, an example second rear bushing 206B disposed within an example second rear bushing housing 207B, an example first front bushing 208A disposed within an example first front bushing housing 209A, and an example second front bushing 208B within an example second front bushing housing 209B. The first cross member 204A includes an example first bushing 210A and an example second bushing 210B. In the illustrated example of FIG. 2, the second cross member 204B includes an example third bushing 210C and an example fourth bushing 210D.

The side rails 202A, 202B extend generally parallel to the longitudinal axis 114 between the cross members 204A, 204B. In the illustrated example of FIG. 2, the side rails 202A and 202B curve upward such that the profiles of the side rails 202A, 202B are concave relative to ground to enable vehicle components (e.g., the axle 107 of FIG. 1) to extend below the side rails 202A, 202B. In other examples, the side rails 202A, 202B can have any other suitable profile (e.g., straight, convex relative to the ground, etc.). In the illustrated example of FIG. 2, the side rails 202A, 202B have circular and hollow cross-sections. In other examples, the side rails 202A, 202B can have any other suitable cross-section (e.g., rectangular, ovoid, etc.). The side rails 202A, 202B can be composed of any suitable material (e.g., steel, cast iron, aluminum, etc.).

The cross members 204A, 204B are structural members of the inner subframe 110 that extend generally parallel to the lateral axis 118. In the illustrated example of FIG. 2, the first cross member 204A extends laterally between the rear bushing housings 207A, 207B and the second cross member 204B extends laterally between the forward bushing housings 209A, 209B. The cross members 204A, 204B can be coupled to the bushing housings 207A, 207B, 209A, 209B via any method or combination thereof (e.g., welds, fasteners, press fits, etc.). In the illustrated example of FIG. 2, the first cross member 204A includes the first bushing 210A and the second bushing 210B and the second cross member 204B includes the third bushing 210C and the fourth bushing 210D. In the illustrated example of FIG. 2, the cross members 204A, 204B are configured such that the contact surfaces of the bushings 210A, 210B, 210C, 210D are oriented along the longitudinal axis 114 of the vehicle 100. In other examples, the cross members 204A, 204B can be angled with respect to the longitudinal axis 114. In the illustrated example of FIG. 2, the first through fourth bushings 210A, 210B, 210C, 210D are disposed closer to the ground than the rear bushings 206A, 206B and the front bushings 208A, 208B. In other examples, some or all of the bushings 210A, 210B, 210C, 210D can be disposed at other suitable location(s) (e.g., in line with the rear bushings 206A, 206B and the front bushings 208A, 208B, above the rear bushings 206A, 206B and the front bushings 208A, 208B, etc.).

The rear bushings 206A, 206B receive a coupling component of the outer subframe 112 to form isolation couplings such that vibrations transmitted between the inner subframe 110 and the outer subframe 112 are damped. For example, the rear bushings 206A, 206B can include a damping material (e.g., silicone, rubber, polyurethane, elastic polymers, etc.) disposed annularly within outer tubes of the rear bushings 206A, 206B. In some examples, the rear bushings 206A, 206B can include deformable tubes. In the illustrated example of FIG. 2, the rear bushings 206A, 206B are disposed within the rear bushing housings 207A, 207B.

The rear bushing housings 207A, 207B are structural components that house the rear bushings 206A, 206B, respectively. In the illustrated example of FIG. 2, the first rear bushing housing 207A receives the first cross member 204A and the first side rail 202A. The second rear bushing housing 207B receives the first cross member 204A and the second side rail 202B. The first rear bushing 206A is disposed within the first rear bushing housing 207A rearward of the intersection of the first cross member 204A to the first side rail 202A. The second rear bushing 206B is disposed within the second rear bushing housing 207B rearward of the intersection of the cross member 204A and the second side rail 202B. In other examples, the first rear bushing 206A can be disposed at the intersection of the first cross member 204A within the first rear bushing housing 207A and the second rear bushing 206B can be disposed at the intersection of the first side rail 202A and the second side rail 202B within the second rear bushing housing 207B. The rear bushing housings 207A, 207B can be composed of steel, aluminum, and/or any other suitable materials.

The front bushings 208A, 208B receive a coupling component of the outer subframe 112 to form isolation couplings such that vibrations transmitted between the inner subframe 110 and the outer subframe 112 are damped. For example, the front bushings 208A, 208B can include a damping material (e.g., silicone, rubber, polyurethane, elastic polymers, etc.) disposed annularly within outer tubes of the front bushings 208A, 208B. In some examples, the front bushings 208A, 208B can include deformable tubes. In the illustrated example of FIG. 2, the front bushings 208A, 208B are disposed at the intersections of the first side rail 202A and the second cross member 204B and the second side rail 202B and the second cross member 204B, respectively. In other examples, the front bushings 208A, 208B can be disposed at any other suitable location (e.g., generally forward of the intersections, etc.).

The example front bushing housings 209A, 209B are structural components that house the front bushings 208A, 208B, respectively. In the illustrated example of FIG. 2, the first front bushing housing 209A receives the second cross member 204B and the first side rail 202A. The second front bushing housing 209B receives the second cross member 204B and the second side rail 202B. In the illustrated example of FIG. 2, the first front bushing 208A within the first front bushing housing 209A is disposed at a same lateral and longitudinal position as the intersection of the second cross member 204B and the first side rail 202A. The second front bushing 208B is disposed within the second front bushing housing 209B at the same lateral and longitudinal position as the intersection of the second cross member 204A and the second side rail 202B. The example front bushing housings 209A, 209B can be composed of steel, aluminum, and/or any other suitable materials.

The bushings 210A, 210B, 210C, 210D receive coupling component(s) of a powertrain (e.g., the powertrain 106 of FIG. 1, etc.) such that vibrations associated with the operation of the drivetrain are damped. For example, the bushings 210A, 210B, 210C, 210D can include a damping material (e.g., silicone, rubber, polyurethane, elastic polymers, etc.) disposed annularly within outer tubes of the bushings 210A, 210B, 210C, 210D. In some examples, the bushings 210A, 210B, 210C, 210D can include deformable tubes. In the illustrated example of FIG. 2, the bushings 210A, 210B, 210C, 210D are uniform in size, shape, and orientation. In other examples, the bushings 210A, 210B, 210C, 210D can have any suitable configuration. While the four bushings 210A, 210B, 210C, 210D are depicted in the illustrated example of FIG. 2, the isolation coupling(s) between the drivetrain and the inner subframe 110 can include any other number of bushing(s) (e.g., 2 bushings, 3 bushings, 6 bushings, etc.).

In the illustrated example of FIG. 2, the bushings 210A, 210B of the example first cross member 204A are disposed lower (e.g., closer to the ground, etc.) than the bushings 210C, 210D of the example second cross member 204B. In other examples, the bushings 210A, 210B, 210C, 210D can have any other suitable spatial relationship. For example, the bushings 210A, 210B, 210C, 210D can be disposed at substantially the same position along the vertical axis 116. In some examples, the configuration of the bushings 210A, 210B, 210C, 210D is based upon the configuration of the powertrain 106 (e.g., the size, the shape, the position of the coupling interfaces, etc.).

Figure 3:
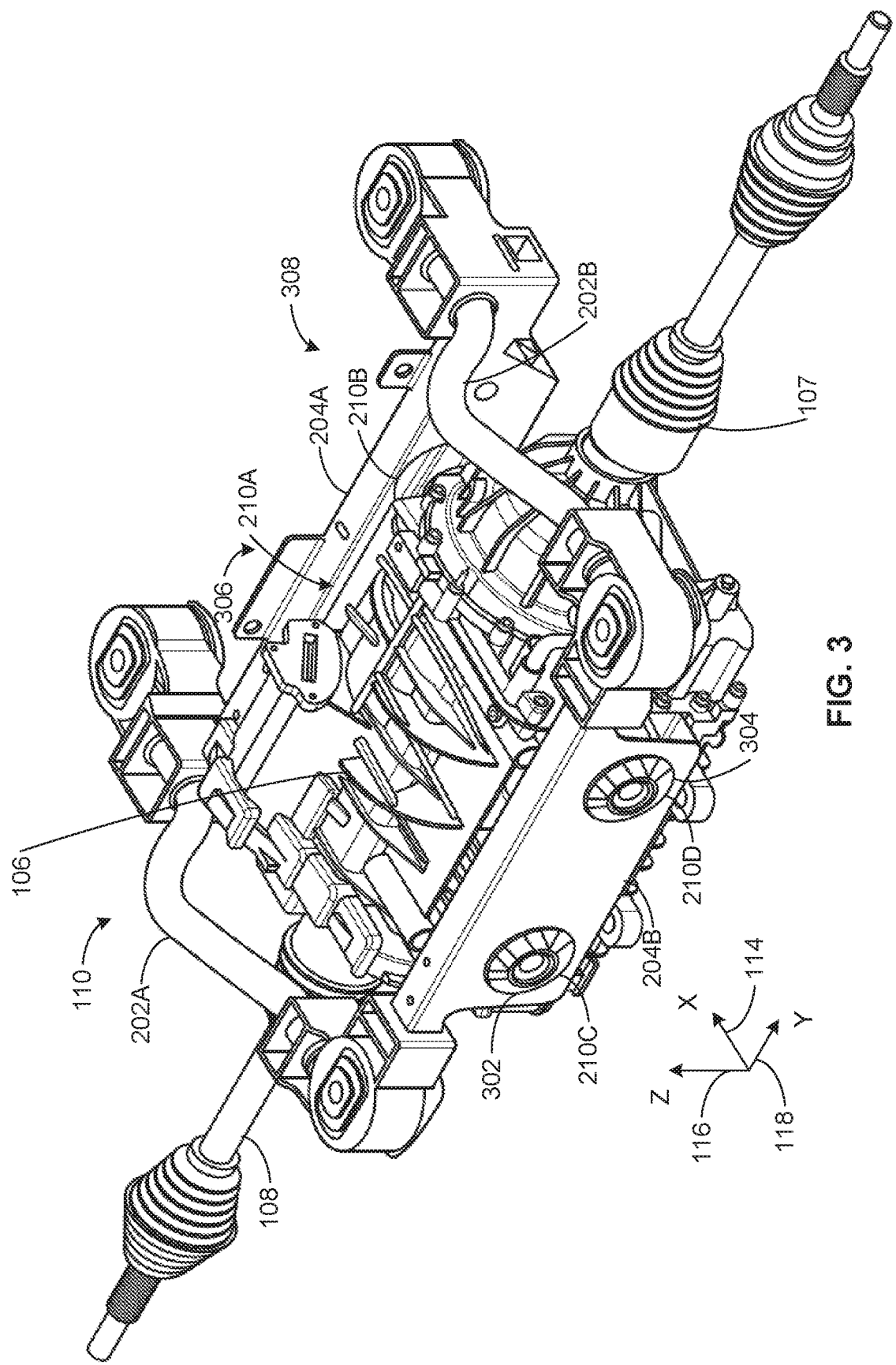
FIG. 3 is an isometric view of the example inner subframe of FIGS. 1 and 2 with a powertrain.

FIG. 3 is an isometric view of the example inner subframe 110 of FIGS. 1 and 2 with the example powertrain 106. In the illustrated example of FIG. 3, the example powertrain 106 is coupled to the example inner subframe 110 via the example bushings 210A, 210B, 210C, 210D. For example, the powertrain 106 can include one or more mounting features (e.g., mounts, journals, pins, etc.) to be coupled within the bushings 210A, 210B, 210C, 210D. In the illustrated example of FIG. 3, the longitudinal motion of the powertrain 106 is constrained by the cross members 204A, 204B and the axial and vertical motion of the powertrain 106 is constrained by the bushings 210A, 210B, 210C, 210D. In the illustrated example of FIG. 3, example isolation couplings 302, 304, 306, 308 are formed by the bushings 210A, 210B, 210C, 210D, respectively. The isolation couplings 302, 304, 306, 308 damp (e.g., eliminate, reduce, etc.) vibrations generated by the powertrain 106 during operation.

In the illustrated example of FIG. 3, the side rails 202A, 202B curve concavely relative to the axle 107. In some examples, the profiles of the side rails 202A, 202B prevents the axle 107 from colliding with the side rails 202A, 202B during operation of the powertrain 106. In other examples, the profiles of the side rails 202A, 202B can curve beneath the axle 107 (e.g., convexly relative to the ground, etc.). In other examples, the powertrain 106 can be coupled to the inner subframe 110 such that the axle 107 is low enough that the side rails 202A, 202B can be substantially straight.

Figure 4:
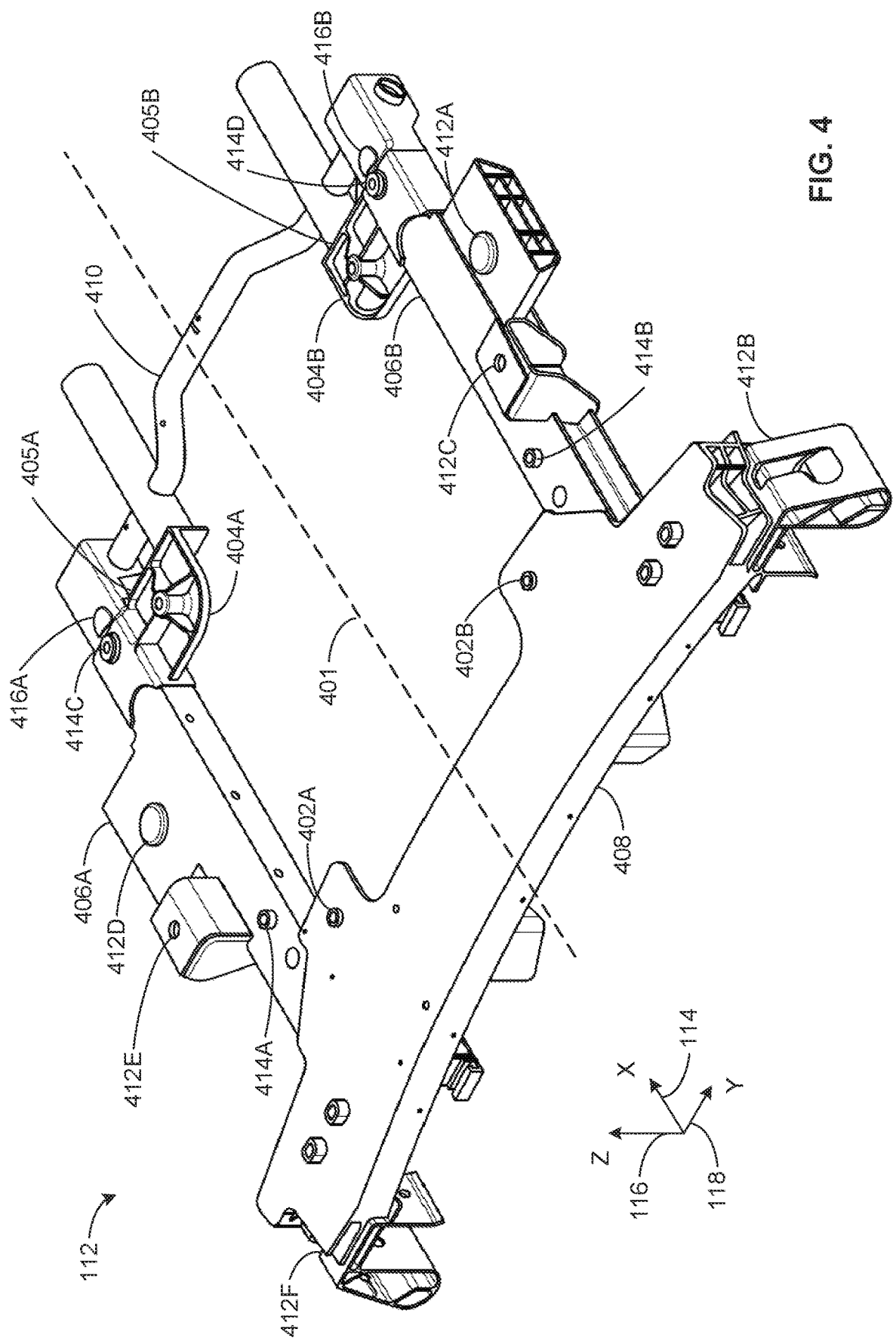
FIG. 4 is an isometric view of the example outer subframe of FIG. 1.

FIG. 4 is an isometric view of the example outer subframe 112 of FIG. 1. In the illustrated example of FIG. 4, the example outer subframe 112 has an example central axis 401 and includes example front bushing interfaces 402A, 402B and example rear bushing interfaces 404A, 404B. In the illustrated example of FIG. 4, the example rear bushing interfaces 404A, 404B are disposed within example bushing interface housings 405A, 405B, respectively. The example outer subframe includes example side rails 406A, 406B, an example cross member 408, and an example horn assembly 410. The example outer subframe 112 includes example suspension mounting features 412A, 412B, 412C, 412D, 412E, example frame mounting features 414A, 414B, 414C, 414D and example bumper mounting features 416A, 416B.

The example bushing interfaces 402A, 402B, 404A, 404B are configured to be coupled to the bushings of the inner subframe 110 (e.g., the rear bushings 206A, 206B and the front bushings 208A, 208B, etc.). In some examples, the bushing interfaces 402A, 402B, 404A, 404B can include features that can be inserted or otherwise coupled to a bushing (e.g., journals, fasteners, etc.). In the illustrated example of FIG. 4, the front bushing interfaces 402A, 402B are proximate to and below the cross member 408 such that the front bushing interfaces 402A, 402B extend vertically downward parallel to the vertical axis 116. In other examples, the front bushing interfaces 402A, 402B can have any other suitable orientation (e.g., extending vertically downward at an angle relative to the vertical axis 116, etc.). In other examples, the front bushing interfaces 402A, 402B can be at any other suitable location on the outer subframe 112. For example, the front bushing interfaces 402A, 402B can be disposed at the intersection of the cross member 408 and the side rails 406A, 406B, respectively.

The rear bushing interfaces 404A, 404B are disposed within the example bushing interface housings 405A, 405B, respectively. In the illustrated example of FIG. 4, the bushing interface housings 405A, 405B extend outwardly from the side rails 406A, 406B, respectively, towards the central axis 401 of the outer subframe 112 and are adjacent to the horn assembly 410. The bushing interface housings 405A, 4045B can be coupled to the side rails 406A, 406B via any suitable method (e.g., welding, one or more fasteners, press-fits, etc.). Additionally or alternatively, the bushing interface housings 405A, 405B can be integral with the side rails 406A, 406B. In the illustrated example of FIG. 4, the bushing interfaces 404A, 404B extend vertically downward parallel to the vertical axis 116. In other examples, the bushing interfaces 404A, 404B can have any other suitable orientation (e.g., extending vertically downward at an angle relative to the vertical axis 116, etc.). In other examples, the rear bushing interfaces 404A, 404B and/or the bushing interface housings 405A, 405B can be at any suitable location. In some examples, the bushing interface housings 405A, 405B can be absent. In such examples, the rear bushing interfaces can be disposed on the side rails 406A, 406B and/or the horn assembly 410.

The example side rails 406A, 406B extend between the cross member 408 and the horn assembly 410. The side rails 406A, 406B provide support for the inner subframe 110 and other vehicle components (e.g., the powertrain 106 of FIG. 1, the suspension assembly 108 of FIG. 1, etc.). That is, the side rails 406A, 406B transfer the loads applied to the inner subframe 110 and/or outer subframe 112 (e.g., loads applied to the suspension assembly 108 of FIG. 1, loads from the operation of the powertrain 106 of FIG. 1, etc.) to the vehicle's frame and/or the cross member 408. In the illustrated example of FIG. 4, each of the first side rail 406A and the second side rail 406B is composed of a unitary cast part. In other examples, the first side rail 406A and/or the second side rail 406B can be composed of multiple parts.

In the illustrated example of FIG. 4, the cross member 408 couples the side rails 406A, 406B and includes suspension mounting features 412F, 412B and the frame mounting features 414A, 414B, 414C, 414D. The cross member 408 transfers load and/or vibrations associated with the side rails 406A, 406B and/or the operation of the vehicle (e.g., from the suspension assembly 108 of FIG. 1 and/or the powertrain 106 of FIG. 1, etc.) to the vehicle frame. In the illustrated example, the cross member 408 is a unitary cast part. In other examples, the cross member 408 can be composed of multiple parts. In some examples, the cross member 408 can be coupled to the side rails 406A, 406B via any suitable means (e.g., welds, fasteners, press fit, etc.). The example side rails 406A, 406B and the cross member 408 can be composed of steel, aluminum, and/or any other suitable materials.

The example horn assembly 410 provide safety features that absorb energy applied at the rear of the vehicle. The horn assembly 410 can be composed of steel, aluminum, and/or any other suitable material(s). In some examples, the horn assembly 410 can include features that allow a bumper to be mounted to the double subframe 102. In some examples, the horn assembly 410 can be absent. In such examples, the rear of the outer subframe 112 can be coupled together via an additional cross member.

The suspension mounting features 412A, 412B, 412C, 412D, 412E, 412F are features that enable a rear suspension system of the vehicle to be mounted to the outer subframe 112. In the illustrated example of FIG. 4, the outer subframe 112 includes features that receive the strut(s), transverse link(s), and/or stabilizer(s) of the suspension such that the outer subframe 112 bears loads transmitted to the vehicle from the vehicle wheels. In some examples, some or all of the suspension mounting features 412A, 412B, 412C, 412D, 412E, 412F can be absent and/or implemented on another feature of the double subframe 102 and/or the vehicle frame (e.g., the inner subframe 110, etc.). Some or all of the suspension mounting features 412A, 412B, 412C, 412D, 412E, 412F can be implemented via a mounting plate, a weld surface, a joint (e.g., a ball joint, a hinged joint, etc.), a bearing, and/or a bushing.

The example frame mounting features 414A, 414B, 414C, 414D are features on the outer subframe 112 that enable the outer subframe 112 to be mounted to the vehicle frame. In some examples, the frame mounting features 414A, 414B, 414C, 414D can include welds, pinned joints, press fits and/or fasteners. In some examples, the outer subframe 112 can be coupled to the vehicle via one or more isolation coupling(s) (e.g., a journal and a bushing, etc.). In some examples, the side rails 406A, 406B can include additional features that allow the outer subframe 112 to be mounted to the vehicle frame.

The example bumper mounting features 416A, 416B are features on the outer subframe 112 that enable a bumper to be mounted to the outer subframe 112. In some examples, the bumper mounting features 416A, 416B can include welds, pinned joints, press fits and/or fasteners. In some examples, the bumper mounting features 416A, 416B can be disposed on the horn assembly 410.

Figure 5:
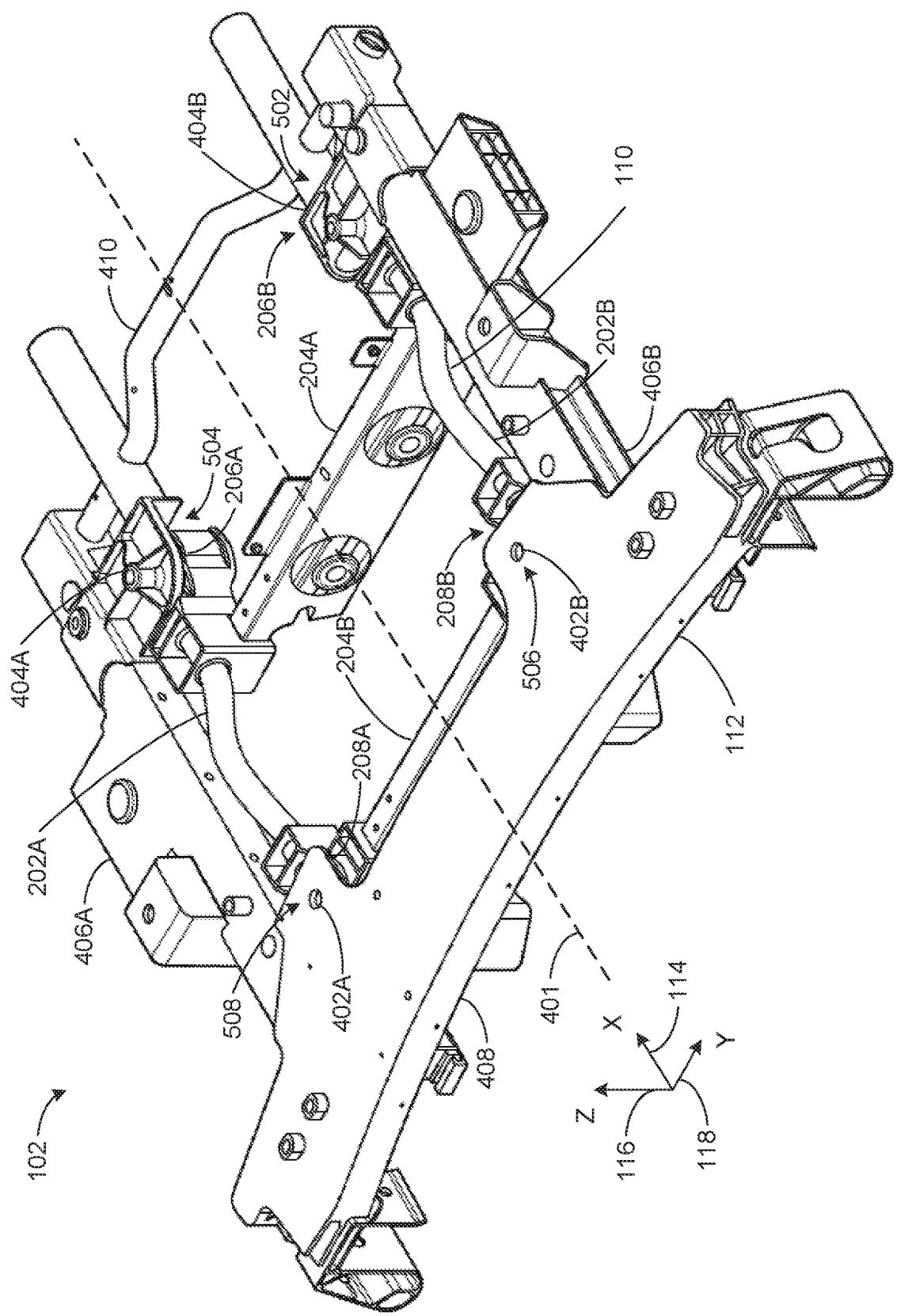
FIGS. 5-7 are example illustrations of the double subframe of FIG. 1 including the example inner subframe of FIGS. 1-2 and the outer subframe of FIGS. 1 and 4.
Figure 6:
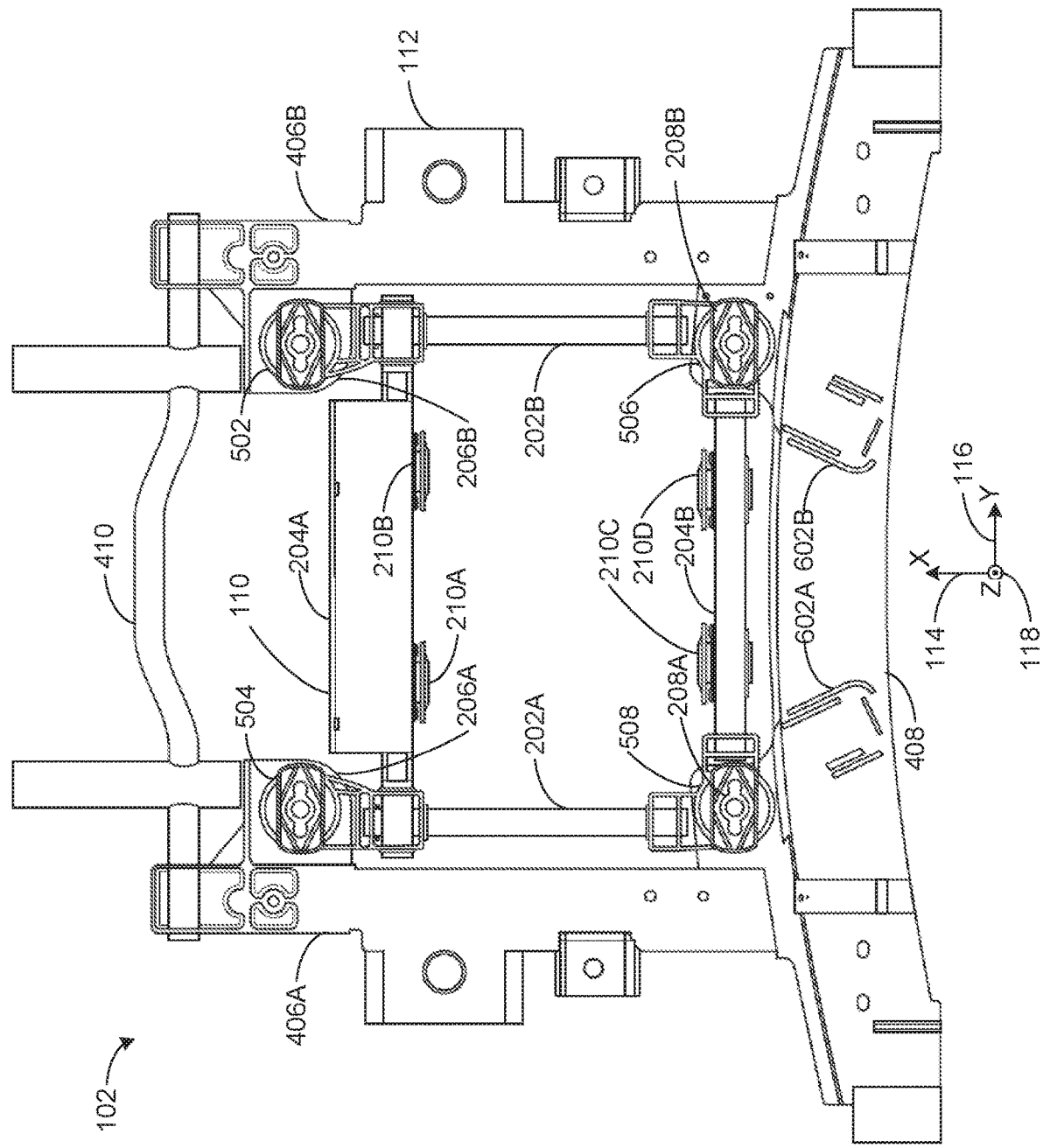
Figure 7:
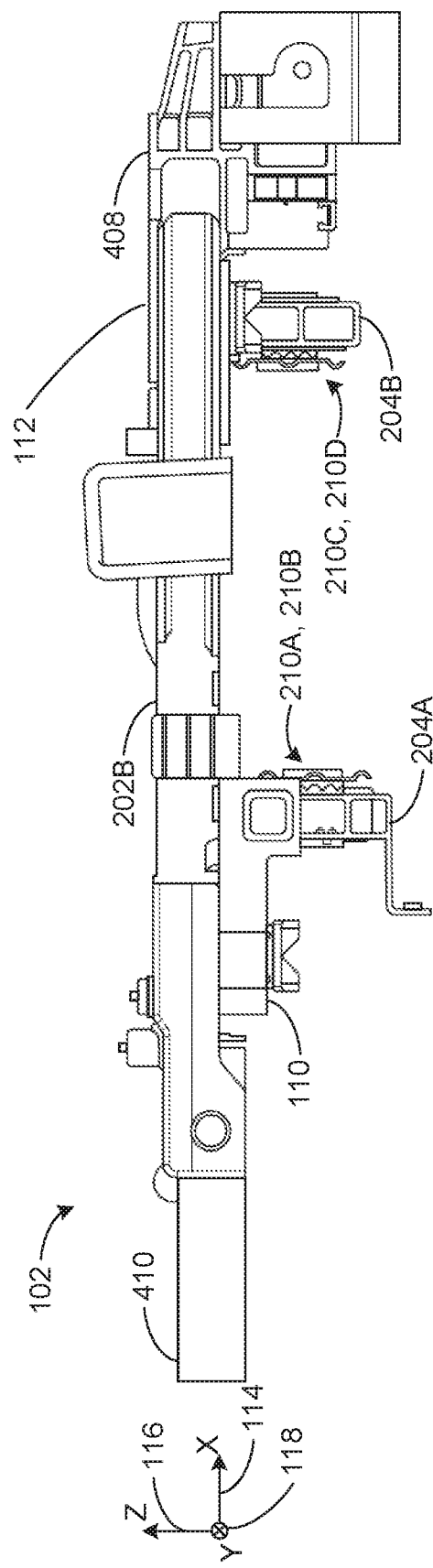

FIGS. 5-7 illustrate the double subframe 102 of FIG. 1. In the illustrated examples of FIGS. 5-7, the example inner subframe 110 and the outer subframe 112 have been coupled together to form the double subframe 102. In the illustrated example of FIGS. 5-7, the inner subframe 110 is coupled to the outer subframe 112 via example isolation couplings 502, 504, 506, 508.

The isolation couplings 502, 504, 506, 508 damp (e.g., reduce, eliminate, etc.) vibrations transmitted between the inner subframe 110 and the outer subframe 112. In the illustrated example of FIGS. 5-7, the first isolation coupling 502 is formed by coupling the second rear bushing 206B and the second rear bushing interface 404B. The example second isolation coupling 504 is formed by coupling the first rear bushing 206A and the first rear bushing interface 404A. The example third isolation coupling 506 is formed by coupling the second front bushing 208B and the bushing interface 402B. The example fourth isolation coupling 508 is formed by the coupling of the first front bushing 208A and the bushing interface 402A.

In the illustrated examples of FIGS. 5-7, the outer subframe 112 substantially surrounds the inner subframe 110. That is, the inner subframe 110 is disposed within a perimeter defined by the side rails 406A, 406B, the cross member 408 and the horn assembly 410 of the outer subframe 112. In the illustrated example of FIGS. 5-7, the first side rail 202A of the inner subframe 110 is closer to the central axis 401 than the first side rail 406A of the outer subframe 112. The second side rail 202B of the inner subframe 110 is closer to the central axis 401 than the second side rail 406B of the outer subframe 112. The first cross member 204A of the inner subframe 110 is closer to the front of the vehicle than the horn assembly 410 of the outer subframe 112. The second cross member 204B of the inner subframe 110 is further to the rear of the vehicle than the cross member 408 of the outer subframe 112. In the illustrated example of FIG. 6, the example double subframe 102 includes example suspension mounts 602A, 602B to which components (e.g., a transverse arm, etc.) of the suspension assembly can be mounted.

Figure 8:
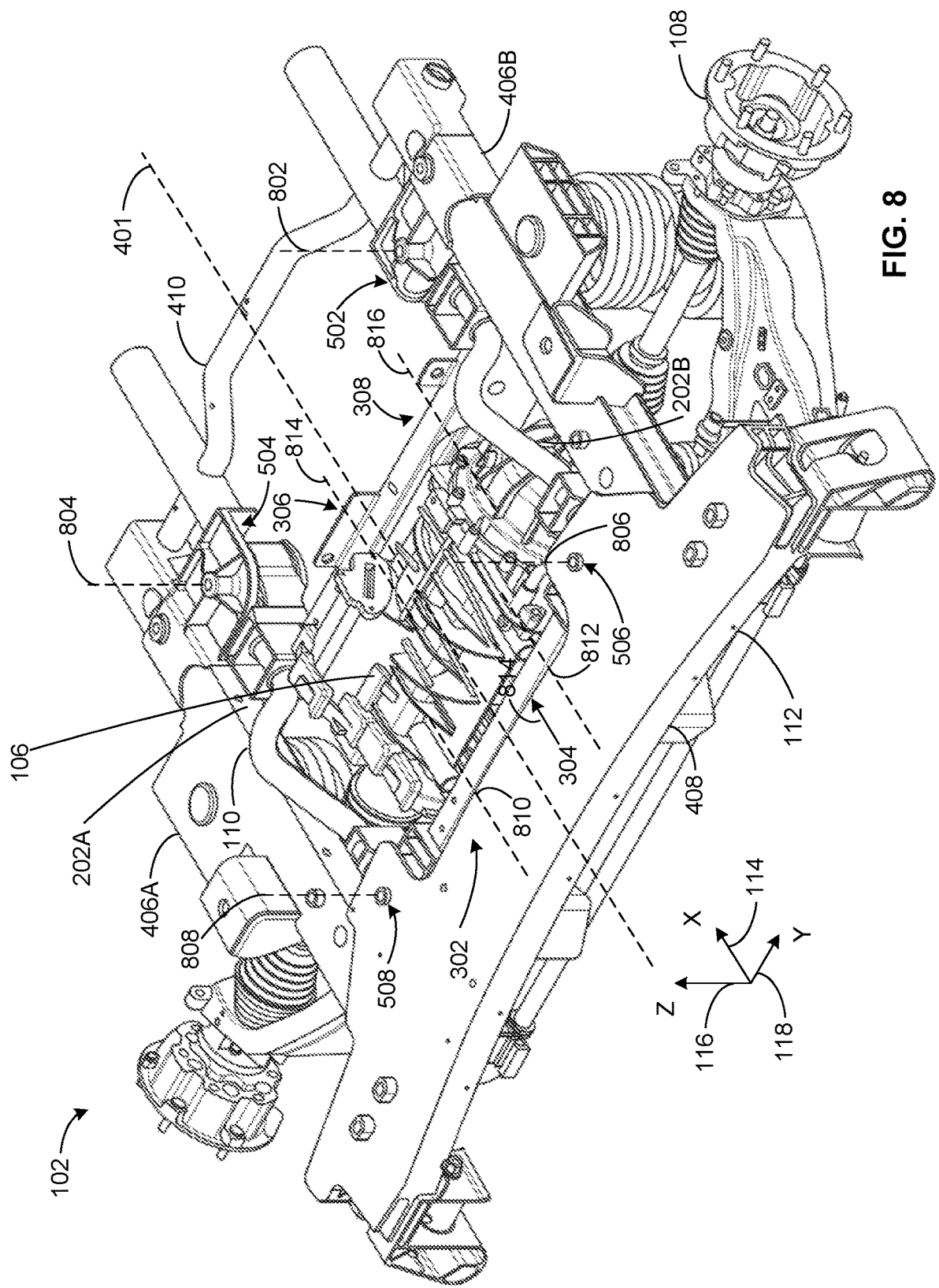
FIG. 8 is an isometric view of the double subframe of FIGS. 1 and 5-7 with a powertrain.

FIG. 8 is an isometric view of the double subframe 102 of FIGS. 1 and 5-7 with the example powertrain 106 and the example suspension assembly 108. In the illustrated example of FIG. 8, the isolation couplings 502, 504, 506, 508 between the inner subframe 110 and the outer subframe 112 and the isolation couplings 302, 304, 306, 308 between the powertrain 106 and inner subframe 110 doubly isolated the vehicle frame from the powertrain 106. As such, NVH caused by the operation of the powertrain 106 is reduced. For example, the double isolation of the vehicle frame 104 from the powertrain 106 reduces the transfer of vibration (e.g., high-frequency vibrations caused by the operation of an electric powertrain, etc.) from the powertrain 106 to the vehicle frame.

In the illustrated example of FIG. 8, the isolation couplings 502, 504, 506, 508 have example central axes 802, 804, 806, 808, respectively, that are oriented along the vertical axis 116 (e.g., the central axis of the journal of the coupling is parallel to the vertical axis 116, etc.) and the isolation couplings 302, 304, 306, 308 have example central axes 810, 812, 814, 816, respectively, that are oriented along the central axis 401 of the vehicle and the longitudinal axis 114 (e.g., the central axis of journal of the coupling is parallel to the longitudinal axis 114, etc.). As such, the central axes 802, 804, 806, 808 of the isolation couplings 502, 504, 506, 508 are oriented perpendicularly to the central axes 810, 812, 814, 816 of the isolation couplings 302, 304, 306, 308. In other examples, the isolation couplings 502, 504, 506, 508 and the isolation couplings 302, 304, 306, 308 can have any other suitable spatial relationship. For example, the central axes 802, 804, 806, 808 of the isolation couplings 502, 504, 506, 508 can be oriented along the longitudinal axis 114 and the central axes 810, 812, 814, 816 of the isolation couplings 302, 304, 306, 308 can be oriented along the vertical axis 116. In other examples, the central axes 802, 804, 806, 808 of the isolation couplings 502, 504, 506, 508 and the central axes 810, 812, 814, 816 of the isolation couplings 302, 304, 306, 308 can have a non-orthogonal relationship.

Figure 9:
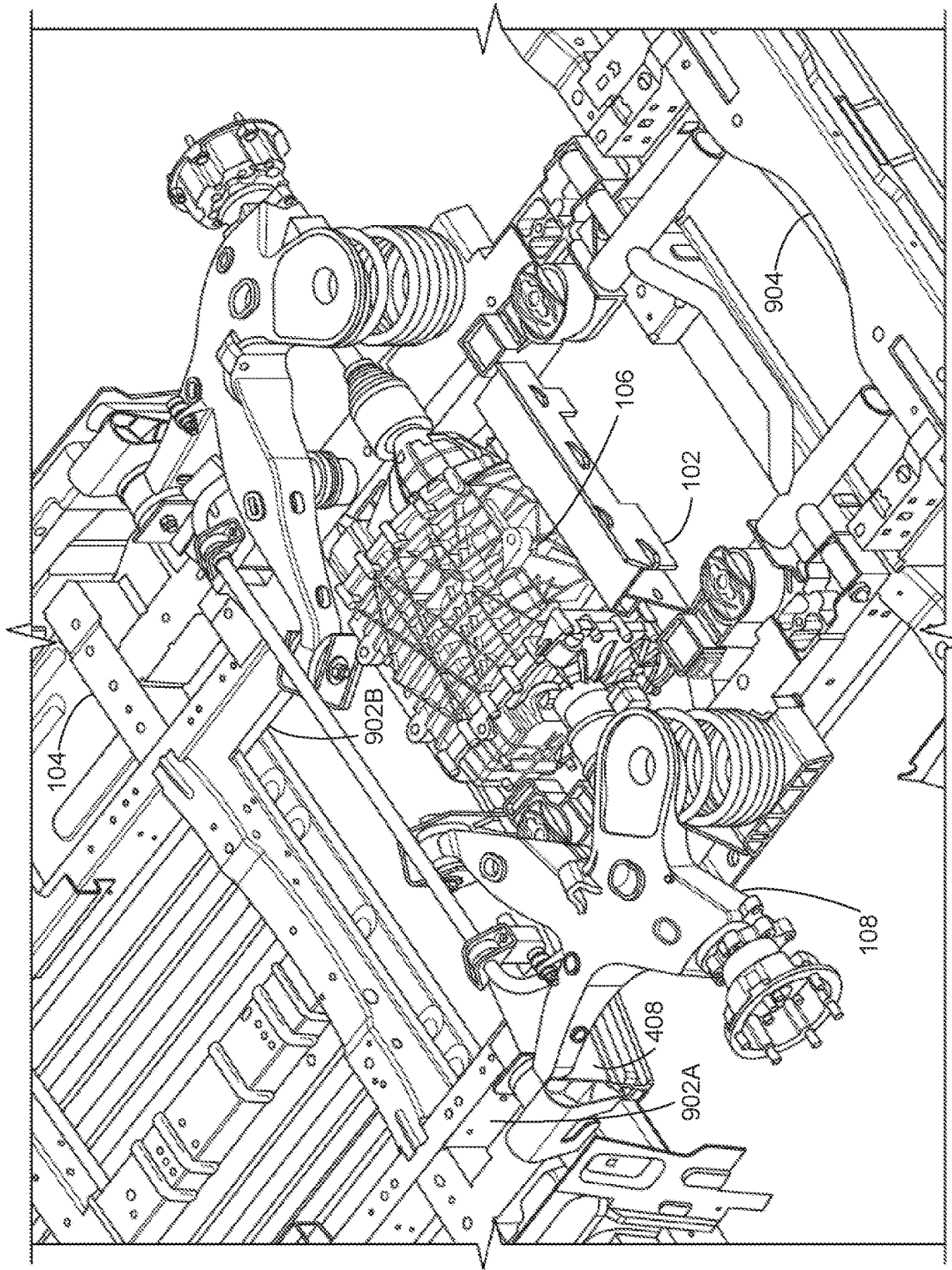
FIG. 9 a view of the double subframe of FIGS. 1 and 5-7 with a powertrain incorporated into a vehicle frame.

FIG. 9 a bottom view of the double subframe 102 of FIGS. 1 and 5-7 with the example powertrain 106 and the example suspension assembly 108 coupled to the example vehicle frame 104. In the illustrated example of FIG. 9, the double subframe 102 has been mounted to example frame side rails 902A, 902B of the vehicle frame 104 (e.g., via the example frame mounting features 414A, 414B, 414C, 414D on the example side rails 406B, 406A of FIG. 4, etc.). In some examples, the double subframe 102 can include additional features that enable the double subframe 102 to be mounted to the vehicle frame via the example cross member 408 and/or the example horn assembly 410. In the illustrated example of FIG. 9, the example horn assembly 410 are disposed behind an example bumper 904, which is coupled to the double subframe (e.g., via the example bumper mounting features 416A, 416B of FIG. 4, etc.). In other examples, the bumper 904 can also be coupled directly to the horn assembly 410.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Double subframe with isolation couplings are disclosed herein. Further examples and combinations thereof include the following: Example 1 includes a vehicle, comprising a powertrain, a frame, a first subframe coupled to the powertrain via a first isolation coupling, and a second subframe coupled at least partially around the first subframe, the second subframe coupled to the frame.

Example 2 includes the vehicle of example 1, wherein the second subframe is coupled to the first subframe via a second isolation coupling.

Example 3 includes the vehicle of example 2, wherein a first central axis of the first isolation coupling is oriented perpendicularly to a second central axis of the second isolation coupling.

Example 4 includes the vehicle of example 3, wherein the first central axis is parallel to a third central axis of the vehicle.

Example 5 includes the vehicle of example 2, wherein the first isolation coupling, and the second isolation coupling damp vibrations transferred from the powertrain to the frame.

Example 6 includes the vehicle of example 1, further including a suspension system coupled to the second subframe.

Example 7 includes the vehicle of example 1, further including a rear axle and wherein the second subframe is coupled above the rear axle.

Example 8 includes an apparatus, comprising a first subframe, and a second subframe disposed about the first subframe, the second subframe coupled to the first subframe via a first isolation coupling.

Example 9 includes the apparatus of example 8, further including a powertrain coupled to the first subframe.

Example 10 includes the apparatus of example 9, wherein the powertrain is coupled to the first subframe via a second isolation coupling.

Example 11 includes the apparatus of example 10, wherein the first subframe includes a first side rail, a second side rail parallel to the first side rail, a first cross member coupled between the first side rail and the second side rail, and a second cross member parallel to the second side rail.

Example 12 includes the apparatus of example 11, further including a first set of couplings, the first set of couplings including the first coupling and wherein ones of the first set of couplings are disposed at intersections of (1) the first side rail and the first cross member, (2) the first side rail and the second cross member, (3) the second side rail and the second cross member and (4) the second side rail and the second cross member.

Example 13 includes the apparatus of example 11, further including a second set of couplings, the second set of couplings including the second coupling and wherein ones of the second set of couplings are disposed on at least one of the first cross member or the second cross member.

Example 14 includes the apparatus of example 11, wherein the first side rail is disposed above an axle of a vehicle and is curved concavely relative to the axle.

Example 15 includes the apparatus of example 8, with the first subframe is coupled to a vehicle frame via a third isolation coupling.

Example 16 includes the apparatus of example 8, wherein the first subframe includes a first set of mounting features, the first set of mounting features enabling a suspension system of a vehicle to be coupled to the first subframe.

Example 17 includes an apparatus, comprising a first subframe coupled to a powertrain of a vehicle, and a second subframe coupled within a perimeter defined by the first subframe via a first coupling, the second subframe coupled to a frame of the vehicle, the first coupling to damp vibrations of the powertrain transmitted to the frame via the second subframe.

Example 18 includes the apparatus of example 17, wherein the powertrain is an electric powertrain and includes a power distribution unit.

Example 19 includes the apparatus of example 17, wherein the first subframe is disposed above a rear axle of the vehicle.

Example 20 includes the apparatus of example 17, wherein the first subframe is coupled to the powertrain via a second coupling, the second coupling to damp the vibrations of the powertrain transmitted to the first subframe from the powertrain.

The following claims are hereby incorporated into this Detailed Description by this reference, with each claim standing on its own as a separate embodiment of the present disclosure.

What is claimed is:

1. A vehicle, comprising:
    a powertrain;
    a frame;
    a first subframe coupled to the powertrain via a first isolation coupling, the first subframe including:
        a first side rail; and
        a second side rail; and
    a second subframe coupled at least partially around the first subframe, the second subframe coupled to the frame, the second subframe including:
        a third side rail farther from a central axis of the vehicle than the first side rail; and
        a fourth side rail farther from the central axis of the vehicle than the second side rail.

2. The vehicle of claim 1, wherein the second subframe is coupled to the first subframe via a second isolation coupling.

3. The vehicle of claim 2, wherein a first central axis of the first isolation coupling is oriented perpendicularly to a second central axis of the second isolation coupling.

4. The vehicle of claim 3, wherein the first central axis is parallel to a third central axis of the vehicle.

5. The vehicle of claim 2, wherein the first isolation coupling, and the second isolation coupling damp vibrations transferred from the powertrain to the frame.

6. The vehicle of claim 1, further including a suspension system coupled to the second subframe.

7. The vehicle of claim 1, further including a rear axle and wherein the second subframe is coupled above the rear axle.

8. An apparatus to be coupled to a frame of a vehicle, comprising:
    a first subframe including:
        a first side rail; and
        a second side rail; and
    a second subframe disposed about the first subframe, the second subframe coupled to the first subframe via a first isolation coupling, the second subframe including:
        a third side rail to be disposed farther from a central axis of the vehicle than the first side rail; and
        a fourth side rail to be disposed farther from the central axis of the vehicle than the second side rail.

9. The apparatus of claim 8, further including a powertrain coupled to the first subframe.

10. The apparatus of claim 9, wherein the powertrain is coupled to the first subframe via a second isolation coupling.

11. The apparatus of claim 10, wherein the second side rail is parallel to the first side rail and wherein the first subframe further includes:
    a first cross member coupled between the first side rail and the second side rail; and
    a second cross member parallel to the second side rail.

12. The apparatus of claim 11, further including a first set of couplings, the first set of couplings including the first isolation coupling and wherein ones of the first set of couplings are disposed at intersections of (1) the first side rail and the first cross member and (2) the first side rail and the second cross member.

13. The apparatus of claim 11, further including a second set of couplings, the second set of couplings including the second isolation coupling and wherein ones of the second set of couplings are disposed on at least one of the first cross member or the second cross member.

14. The apparatus of claim 11, wherein the first side rail is to be disposed above an axle of the vehicle and is curved concavely relative to the axle.

15. The apparatus of claim 8, with the first subframe is coupled to a vehicle frame via a third isolation coupling.

16. The apparatus of claim 8, wherein the first subframe includes a first set of mounting features, the first set of mounting features enabling a suspension system of the vehicle to be coupled to the first subframe.

17. An apparatus, comprising:
    a first subframe coupled to a powertrain of a vehicle, the first subframe including:
        a first cross member; and
        a second cross member disposed closer to a front of the vehicle than the first cross member; and
    a second subframe coupled to the first subframe via a first coupling, the second subframe coupled to a frame of the vehicle, the first coupling to damp vibrations of the powertrain transmitted to the frame via the second subframe, the second subframe including:
        a third cross member, the second cross member disposed closer to a rear of the vehicle than the third cross member; and
    a horn assembly, the first cross member disposed closer to the front of the vehicle than the horn assembly.

18. The apparatus of claim 17, wherein the powertrain is an electric powertrain and includes a power distribution unit.

19. The apparatus of claim 17, wherein the first subframe is disposed above a rear axle of the vehicle.

20. The apparatus of claim 17, wherein the first subframe is coupled to the powertrain via a second coupling, the second coupling to damp vibrations of the powertrain transmitted to the first subframe from the powertrain.

* * * * *